Feb. 15, 1938.   H. C. SMITH   2,108,237
METAL CUTTING TOOL
Filed Dec. 24, 1936
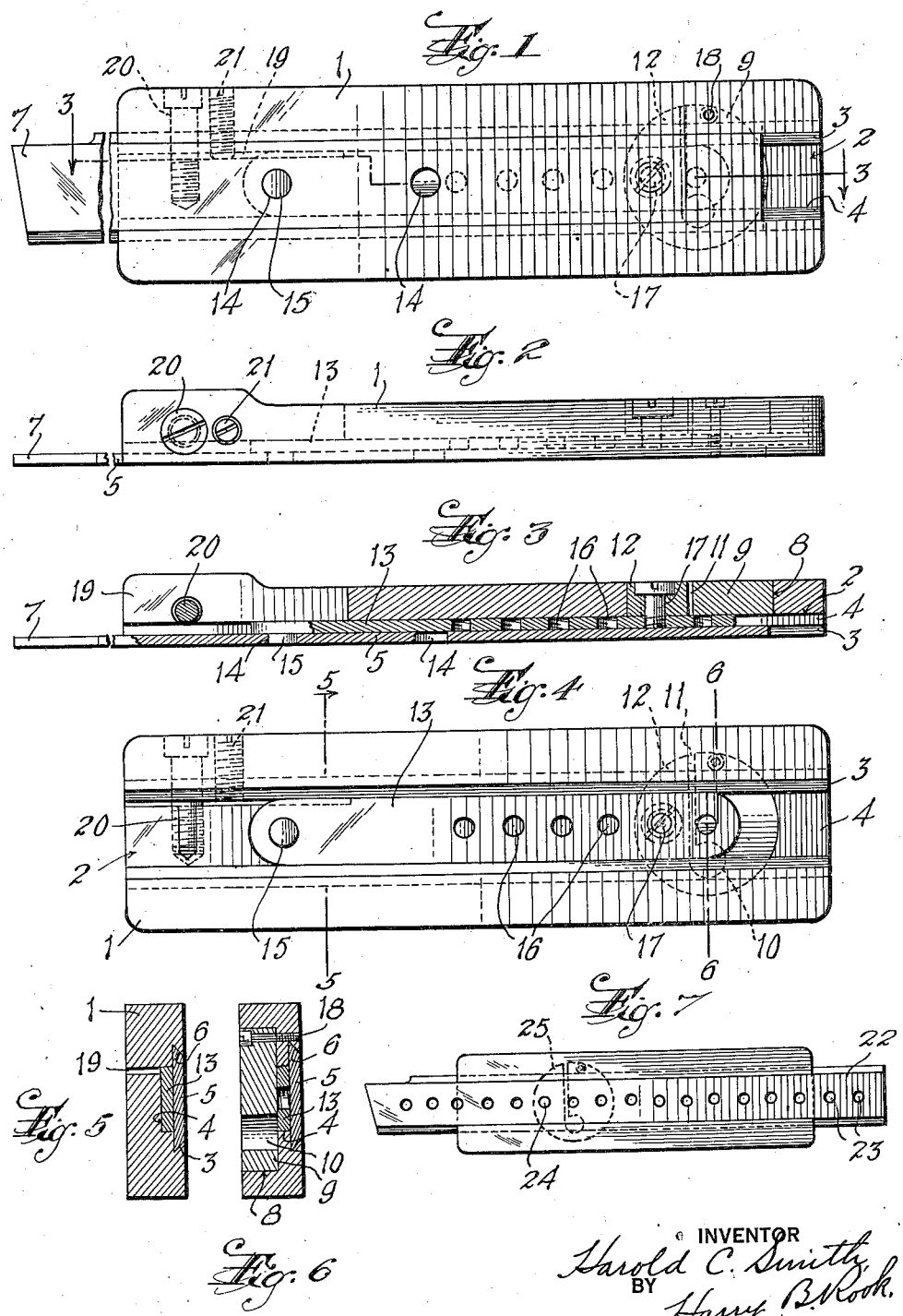
INVENTOR
Harold C. Smith
BY Harry B. Rook
ATTORNEY Patented Feb. 15, 1938

2,108,237

UNITED STATES PATENT OFFICE 2,108,237

METAL CUTTING TOOL

Harold C. Smith, West Orange, N. J., assignor of one-half to Richard C. Johnson, West Orange, N. J.

Application December 24, 1936, Serial No. 117,448

12 Claims. (Cl. 29—96)

This invention relates generally to metal cutting tools and particularly to cutting-off tools, thread cutting tools and the like.

One object of the invention is to provide a novel and improved tool of the character described wherein the cutter or bit shall be yieldingly mounted to prevent chattering of the tool, breaking of the cutter, and gouging of the work, for example when the tool encounters excessive resistance to cutting as when the tool is advanced too rapidly into the work, or is set for an excessively deep cut.

Another object is to provide such a tool which shall comprise a holder and a cutting blade, and novel and improved means for mounting the blade in the holder so that the blade shall be capable of yielding linearily from the work in the plane of advance of the cutter to the work upon encountering excessive resistance to cutting, and can be repeatedly ground and adjusted and reversed in the holder so as to be operative for a long time without replacement of the cutter.

A further object is to provide a tool of this character including a novel and improved strong and durable spring on the holder and novel and improved means for separably connecting the cutter blade to said spring to permit repeated adjustment and reversal of the blade in the holder to compensate for wear, and to ensure linear movement of the blade from the work and the same degree of spring resistance to yielding of the blade in all adjusted positions of the blade.

Other objects are to provide in a cutting tool, the combination of a holder or shank, a blade and a yielding mounting for the blade in combination with means for providing and regulating frictional resistance to linear sliding of the blade in the holder to adjust the blade to yield upon encountering a predetermined degree of resistance and to prevent "snap" action of the blade against and under the influence of the spring; and to obtain other advantages and results as will appear from the following description when read in conjunction with the accompanying drawing in which Figure 1 is a side elevation of a metal cutting tool embodying the invention.

Figure 2 is a top plan view thereof.

Figure 3 is a horizontal sectional view on the line 3—3 of Figure 1.

Figure 4 is a view similar to Figure 1 with the cutter blade removed.

Figure 5 is a transverse sectional view on the line 5—5 of Figure 4.

Figure 6 is a similar view on the line 6—6 of Figure 4, and

Figure 7 is a side elevation of a modified form of tool.

Specifically describing the invention, the tool comprises a shank 1 in the general form of a rectangular bar which has a longitudinal recess 2 extending throughout the length thereof. As shown, this recess comprises an undercut or dove-tail groove 3 and a narrower groove 4 at the base of the groove 3.

Within the undercut groove 3 is longitudinally slidable a cutter blade 5 which has its longitudinal edges beveled at 6 to fit the undercut edges of the groove 3. Normally one end of the blade projects from the shank 1 and is formed into a suitable cutter or bit 7.

The shank 1 also has a transverse recess or opening 8 at one side of the recess 2 preferably circular which intersects or opens into the base or bottom of the groove 4. Within the recess 8 is a spring member 9 which is shown in the form of a circular disk of springy material such as spring steel having a transverse hole 10 from which a chordal slot 11 leads outwardly through the edge of the disk to form a spring wing 12.

A link 13 is fitted into the groove 4 and connected at points spaced longitudinally thereof with the cutter blade and the spring member 9 for yieldingly resisting sliding of the cutter blade under working thrust upon the blade. As shown, the cutter blade has two transverse holes 14 and one end of the link 13 has a stud 15 to selectively fit either of the holes 14. The link also has a plurality of threaded holes 16 spaced longitudinally thereof to receive a threaded stud or screw 17 which freely passes through the spring wing 12. If desired, the screw 17 might be threaded into the spring wing and have a free fit in the openings 16.

Preferably the spring member 9 is secured in the transverse recess 8 as by a screw 18 threaded into the shank.

In assembling the tool the stud 15 of the link is fitted into the proper hole 14 of the cutter blade after which the link and cutter blade are slid into the respective grooves 4 and 3 whereupon the stud 17 is fitted into the proper hole 16 of the link. The tool may then be mounted in the tool post of a lathe, or otherwise mounted as desired. In use, should the cutter blade encounter excessive resistance in the cutting operation, it may yield linearly away from the work in a plane approximately parallel to the direction in which the blade has been advanced toward the work, the spring wing 12 flexing in a plane parallel to the direction of sliding of the blade and yieldingly resisting the sliding of the blade away from the work. In this way, chattering or breaking of the cutter bit and gouging of the work are prevented, and due to the linear movement of the cutter blade the cutter will entirely free or clear itself from the work rather than be oscillated or rotated beneath the work as would be the case if the cutter blade were mounted to swing rather than slide.

To adjust the tool to permit yielding of the blade when a predetermined degree of resistance is encountered and to ensure against "snap" action of the blade against and under the influence of the spring member, preferably the shank is formed with a transverse slot 19 parallel to and intersecting the longitudinal recess 2, and a screw 20 loosely passes through the portion at one side of the slot and is threaded into the portion of the shank at the other side of the slot. By tightening or loosening the screw 20, the frictional engagement of the opposite sides of the undercut groove 3 on the edges of the cutter blade may be varied to provide the proper frictional resistance to sliding of the blade against and under the influence of the spring member. A second set screw 21 may be threaded into the shank at one side of the slot to cooperate with the screw 20 in making the desired adjustment.

A modification of the invention is shown in Figure 7 where the link 13 is omitted, and the cutter blade 22 has a plurality of openings 23 spaced longitudinally thereof to selectively receive a stud, screw or pin 24 for connecting the blade directly to the spring member 25.

The structure shown in Figures 1 to 6 inclusive is preferable in that the use of the link avoids the necessity for forming the holes 23 in each cutter blade.

In both forms of the invention the blade may be adjusted and reversed as desired to compensate for wear or breakage, by simply connecting the stud 15 to the proper opening 14 and the stud 17 to the proper opening 16 in the form shown in Figures 1 to 6 inclusive, and by placing the pin 24 in the proper opening 23 of the form of the invention shown in Figure 7.

While I have shown the invention as embodied in certain details of structure, it should be understood that this is primarily for illustrating the principles of the invention and that many modifications and changes can be made in the details of construction of the tool without departing from the spirit or scope of the invention.

Having thus described my invention, what I claim is:

1. A metal cutting tool comprising a shank having a longitudinal recess, a cutter blade longitudinally slidable in said recess, a disk of spring material mounted on said shank at one side of said recess and said blade and having a transverse slot forming a resilient wing to flex in a plane parallel to the direction of sliding of the blade, and means connecting said blade to said wing, whereby the wing will yieldingly resist sliding of said blade under the working thrust on the blade.

2. A metal cutting tool comprising a shank having a longitudinal recess, a cutter blade longitudinally slidable in said recess, a spring mounted on said shank at one side of said recess and said blade, and a link separably connected at spaced points in its length to said blade and said spring, whereby the spring will yieldingly resist sliding of said blade under the working thrust on the blade.

3. A metal cutting tool comprising a shank having a longitudinal recess, a cutter blade longitudinally slidable in said recess, a spring mounted on said shank at one side of said recess and said blade, said blade having a transverse opening therethrough and said spring having a stud thereon, a link having a stud and an opening respectively separably fitted in said opening in the blade and separably receiving said stud on the spring, whereby the spring will yieldingly resist sliding of said blade under the working thrust on the blade.

4. A metal cutting tool comprising a shank having a longitudinal recess and a transverse recess opening through one side of said longitudinal recess, a cutter blade fitted in said longitudinal recess to longitudinally slide in the recess under working thrust on the blade, a spring fitted in said transverse recess, and means independent of said shank for connecting said blade to said spring, whereby the resiliency of the spring will yieldingly resist sliding of said blade under the working thrust on the blade.

5. A metal cutting tool comprising a shank having a longitudinal recess and a transverse recess opening through one side of said longitudinal recess, a cutter longitudinally slidably fitted in said longitudinal recess, a disk of springy material fitted in said transverse recess and having a transverse slot forming a resilient wing to resiliently flex in a plane parallel to the direction of sliding of said blade, a link in said longitudinal recess between said cutter and said disk, and means connecting said link to said wing of said disk and to said blade, whereby the resiliency of the disk will yieldingly resist sliding of said blade under the working thrust on the blade.

6. A metal cutting tool comprising a shank having a longitudinal recess and a transverse recess opening through one side of said longitudinal recess, a cutter longitudinally slidably fitted in said longitudinal recess, a disk of springy material fitted in said transverse recess and having a transverse slot forming a resilient wing to resiliently flex in a plane parallel to the direction of sliding of said blade, a link in said longitudinal recess between said cutter and said disk, a separable stud and opening connection between said link and said wing, and a similar connection between said link and said blade.

7. A metal cutting tool comprising a shank having a longitudinal recess and a transverse recess opening through one side of said longitudinal recess, a cutter longitudinally slidably fitted in said longitudinal recess, a disk of springy material fitted in said transverse recess and having a transverse slot forming a resilient wing to resiliently flex in a plane parallel to the direction of sliding of said blade, a link in said longitudinal recess between said cutter and said disk, said wing having a stud and said blade having an opening and said link having an opening and a stud respectively to separably receive said stud on said wing and to separably fit said opening in the blade.

8. A metal cutting tool comprising a shank having a longitudinal recess and a transverse recess intersecting said longitudinal recess, a cutter fitted in said longitudinal recess to slide longitudinally under working thrust on the blade, a spring in said transverse recess, and means connecting said blade to said spring whereby resiliency of the spring will yieldingly resist sliding of said blade under working thrust on the blade, said shank having a slot intersecting said longitudinal recess and approximately parallel thereto, and a screw connecting the portions of the shank at opposite sides of said slot for varying the frictional engagement of opposite sides of said recess with said blade to frictionally resist sliding of the blade against and under the influence of said spring.

9. A metal cutting tool comprising a shank having a longitudinal recess, a cutter blade slidable longitudinally in said recess and having a transverse opening, a spring on said shank at one side of said recess, and a stud separably fitted in said opening in said cutter blade and connected to said spring to positively connect said cutter blade to the spring.

10. A metal cutting tool comprising a shank having a longitudinal undercut groove, a second and narrower longitudinal groove in the base of the first groove, a cutter blade longitudinally slidable in the first groove, a spring member on said shank at the base of the second groove, and a link in said second groove and connected to said spring member and said blade, whereby the spring will yieldingly resist sliding of said blade under the working thrust on the blade.

11. A metal cutting tool comprising a shank having a longitudinal undercut groove, a second and narrower longitudinal groove in the base of the first groove, and a transverse recess opening through the base of said second groove, a cutter blade longitudinally slidably fitted in the first groove, a spring disk fitted in said transverse recess and having a transverse slot forming a resilient wing to flex in a plane parallel to the direction of sliding of said blade, and a link in said second groove and connected to said resilient wing and said blade.

12. A metal cutting tool comprising a shank having a longitudinal recess and a transverse recess intersecting said longitudinal recess, a cutter blade fitted in said longitudinal recess to longitudinally slide under working thrust on said blade, a spring member mounted in said transverse recess and having a resilient wing to flex in a plane parallel to the direction of sliding of said blade, and means independent of said shank for connecting said blade to said wing, whereby resiliency of said wing will yieldingly resist sliding of the blade under working thrust on the blade.

HAROLD C. SMITH.